(12) United States Patent
Kwok

(10) Patent No.: US 7,133,211 B2
(45) Date of Patent: Nov. 7, 2006

(54) PROJECTOR WITH FLAT LIGHT SOURCES

(75) Inventor: Hoi-Sing Kwok, Hong Kong (CN)

(73) Assignee: Integrated Microdisplays Limited, Clear Water (HK)

(*) Notice: Subject to any disclaimer, the term of this patent is extended or adjusted under 35 U.S.C. 154(b) by 0 days.

(21) Appl. No.: 10/815,673

(22) Filed: Apr. 2, 2004

(65) Prior Publication Data

US 2005/0225882 A1   Oct. 13, 2005

(51) Int. Cl.
*G02B 3/00* (2006.01)
*G03B 21/14* (2006.01)

(52) U.S. Cl. .................. 359/649; 359/618; 353/20; 353/31; 353/37

(58) Field of Classification Search ............ 359/649, 359/618, 634, 625, 242; 353/20, 31, 33, 353/34, 37, 81; 349/7–9
See application file for complete search history.

(56) References Cited

U.S. PATENT DOCUMENTS 6,036,318 A * 3/2000 Itoh ........................ 353/20
6,257,728 B1 * 7/2001 Bergman et al. ........... 353/31
6,262,851 B1 * 7/2001 Marshall ................... 359/634
6,795,249 B1 * 9/2004 Shioya ...................... 359/618

* cited by examiner

*Primary Examiner*—Ricky L. Mack
*Assistant Examiner*—M. Hasan
(74) *Attorney, Agent, or Firm*—Buchanan Ingersoll PC

(57) ABSTRACT

Optical system designs for projectors using flat light sources are disclosed. These projectors make use of imagers that manipulate the transmission or reflectance of light through electronically controlled pixels. The optical systems of the invention employ a rectangular flat light source that is matched to the aspect ratio of the imager itself, thus enabling very efficient use of light. Several flat light sources are possible for this projection system, including flat fluorescent lights and field emission light sources. Collimation of these light sources is an option. Polarization conversion means is also disclosed for such flat light sources, so that the light output is almost totally linearly polarized. Such projection systems can be very compact.

42 Claims, 7 Drawing Sheets

PROJECTOR WITH FLAT LIGHT SOURCES

FIELD OF THE INVENTION

The present invention relates to projection displays, and in particular to optical projection systems that employ flat light sources, also called planar light sources.

BACKGROUND OF THE INVENTION

Projection displays are used widely in many applications. A typical projection display consists of an illumination system that consists of a nearly point light source 1, optics 2 for the collimation of the light source, a polarizing beam splitter 4 that separates the input and output light onto/from the an imager 5 that modulates the transmittance or reflectance of the input light, and a projection lens 6 that projects the said images onto a screen 7. For an imager that works by polarization manipulation, a means 3 for the conversion of said light source into a single polarization is needed, adding to the complexity of the system. The polarization converter 3 often includes a device which may be separate or the same to homogenize the input light. An optional optical system for the separation of the input light source 1 into three separate red, green and blue primary colors is often times used to provide full colors. In this case, three separate imagers are provided to modulate the transmittance or reflectance of the three primary colors. In most such systems, a color recombination system is combined with the color separation system before the projection lens 6. Many systems for the color management of projection systems have been proposed.

In a conventional projector, the light source is a pseudo point source in the form of an arc. This arc has a finite dimension which can be 1–3 mm long and 1 mm wide. Moreover, the quartz enclosure gives rise to unwanted focusing and defocusing effects, making the assumption of a point source impossible.

Without a point source, the etendue of the optical system becomes large and is not favorable to good optical efficiency. The efficiency of such a projection system is therefore rather unsatisfactory. Typically less than 20% of the light output from the light source is projected onto the screen. For a 120 W arc lamp, for example, only 1200 lm of the 8000 lm output from the lamp is utilized. While most of the light is lost due to the large etendue of the illumination system compared with that of the imager, there is also significant loss of light in the matching the geometric shape of the point light source, usually circular, to the form factor of the imager which is usually rectangular. The form factor of the imager can take on various values of 4:3 or 16:9 depending on the source of the video signal. Television is usually in a 4:3 format while movies are in the 16:9 format. Either way, much light is lost due to the geometric shape of the projection light source.

SUMMARY OF THE INVENTION

According to the present invention there is provided a projection system comprising a substantially planar light source, imaging means for imaging said planar light source onto a light valve imager, and a projection means for projecting the image on the light valve imager onto a screen.

Suitable forms of planar light source that may be used in embodiments of the present invention include vacuum field emission devices, cold cathode fluorescence lamps with a planar discharge plasma, and an array of light emitting diodes arranged in a closely packed manner on a plane.

The particular geometry of the projection system of the present invention will depend on the imaging technology used.

According to a further aspect of the present invention there is therefore provided a projection system comprising (a) a substantially planar light source, (b) means for converting light from said planar light source into a single polarization, (c) an imaging lens for imaging said planar light source onto a light valve imager, (d) a polarizing beam splitter for separating the input and output light on the said light valve imager, and (e) a projection lens to project the image on the light valve imager onto a screen.

According to a further aspect of the invention there is provided a projection system comprising (a) a substantially planar light source, (b) means for converting light from said planar light source into a single polarization, (c) an imaging lens for imaging said planar light source onto a transmittive active matrix liquid crystal cell light valve imager, and (d) a projection lens for projecting the image on the light valve imager onto a screen.

The above geometries can also be used to form a full color projection system either by temporally sequencing the light source to provide red, blue and green light that is combined by a viewer to produce a full color image, or by providing separate optical paths for red, blue and green light that are combined to form a final image (for example by an X-cube prism).

According to a still further aspect of the present invention there is provided a projection system comprising (a) a substantially planar light source, (b) means for pulsing the said light source to provide red green and blue colors sequentially in time, (c) an imaging lens for imaging said planar light source onto a reflective digital mirror light valve imager, and (d) a projection lens for projecting the image on the said light valve imager onto a screen.

BRIEF DESCRIPTION OF THE DRAWINGS

Some embodiments of the invention will now be described by way of example and with reference to the accompanying drawings, in which.

DETAILED DESCRIPTION OF THE PREFERRED EMBODIMENTS

Figure 1:
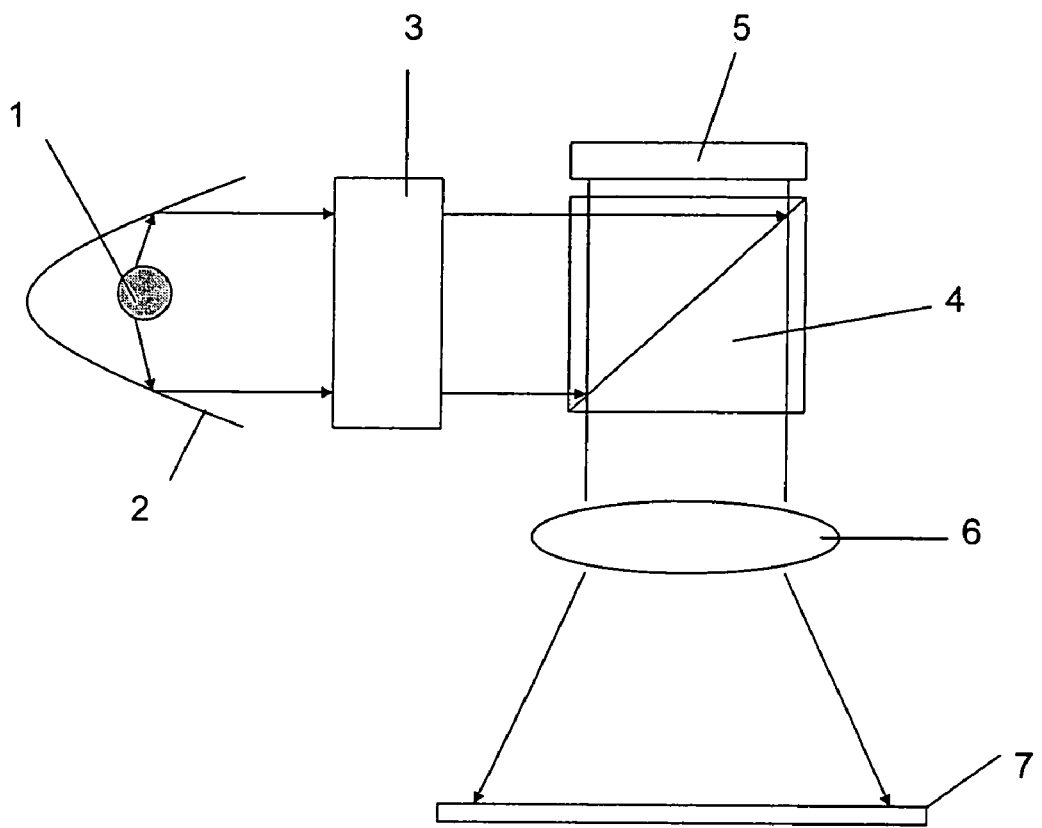
FIG. 1 shows a conventional projection system according to the prior art.

This invention relates to new designs of optical systems for projectors. The projector can either be front projection or rear projection type. In the present invention, a flat light source is used as the illuminator for the projector. The advantages of a flat light source are many, including high light utilization efficiency, good matching of form factor and the ease of polarization conversion. Most importantly, simple imaging optics can be used in the projection system rather than the usual nonimaging optics. The overall light efficiency and optical design becomes very simple. The present invention can be applied to many projections systems using one or three panels as the imager. It can also be used for transmittive as well as reflective light valves.

As will be seen from the following embodiments, the form factor of the light source can be matched exactly to that of the imager. Thus light utilization efficiency is much improved. The increased efficiency implies that smaller power lamps can be used to produce the same light output.

In addition to the easy form factor matching, planar light sources can also be converted into a single polarization easily. Polarized light is used in many imagers such as liquid crystal light valves. Polarization conversion can be performed in the same manner as in conventional backlights, with a polarization dependent reflector and a quarter wave plate. Furthermore, the planar light source can also be imaged onto the imager without loss of light if it is somewhat collimated. The collimation of the planar light source needs to fit the f-number of the imaging lens and the projection lens and the imager itself. This collimation of the planar light source can be performed with many types of optical films such as the BEF® of 3M Company or the light scattering films from Physical Optics Company.

Several planar light sources can be used in embodiments of the present invention. Many such high brightness light sources are in the process of development. For example, the light source can be a vacuum field emission device or it can also be a gas discharge fluorescent lamp. With planar light sources such as these, the optical system for the projector becomes much simplified using the planar light sources.

Flat or planar light sources are available in many technologies, including fluorescent lamp (FL) and field emission devices (FED). The important observation is that these light sources can be made into high brightness sources suitable for projection. Traditionally flat light sources are generally made of a linear light source such as cold cathode fluorescence light (CCFL) tube together with a flat (two-dimensional) light guide/diffusion layer to disperse the light in a plane from which light can be scattered out. Such light sources may not always be bright enough for the best quality projection. A two-dimensional array of point sources such as tiny lamps and other sources such as light emitting diodes (LED) can also be regarded as a flat light source to a certain extent and can be used in the present invention.

Field emission devices (FED) making use of electron beams inside a vacuum to excited a layer of phosphor can also be regarded as a flat light source. Even though the FED was invented originally for displays applications, they can also be used as intense flat light sources for many applications.

Another true planar light source is a two-dimensional gas discharge and a phosphor layer. In order to maintain a uniform two-dimensional gas discharge, techniques such as barrier ribs, linear arrays, are used. In all cases, the resultant pseudo-two-dimensional gas discharge is then allowed to excite a phosphor as in an ordinary fluorescent lamp (FL).

In all projectors, the image forming light valve is planar. A planar light source can be imaged directly onto such imagers with high efficiency. Moreover the light on the imager can be imaged onto the projection screen by a projection lens. A flat light source is ideal for projection applications.

Figure 2:
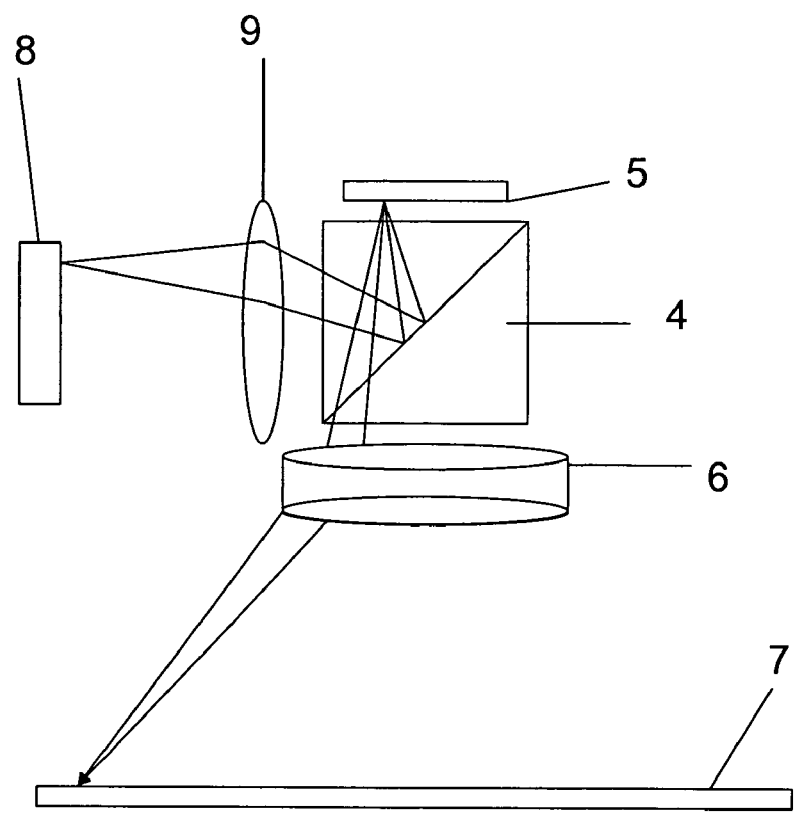
FIG. 2 shows a projection system according to a first embodiment of the present invention.

FIG. 2 shows the first preferred embodiment of the present invention. A flat light source 8 is used as the light source for the projector. This flat field is projected by an imaging lens 9 onto the imager 5 vi a beam splitter 4. Since the light source is flat and has the same form factor as the imager, exact imaging optics can be used with precision. Light reflected from the imager is then imaged onto the screen 7 by a projection lens 6 as in a conventional projector.

In this first preferred embodiment, the imager 5 can be formed with red, green and blue pixels for full color projection. In this case, the flat light source should be a white light source. The imager 5 can also be a black and white imager for a black and white projector. Another possibility is that the imager 5 can be colorless, but the flat light source can pulse sequentially red green and blue light, the effect of which is that full color can be achieved by temporal integration of color subframes by the observer.

Figure 3:
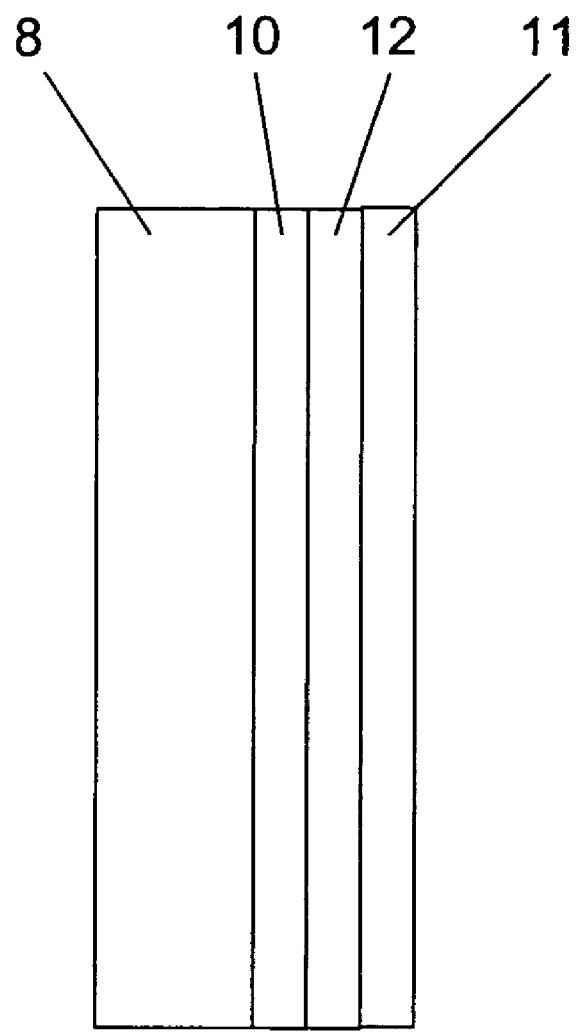
FIG. 3 shows a flat light source for use in an embodiment of the present invention.

Optionally, the flat light source 8 can be formed with collimation optics 10 (FIG. 3) which can be a BEF® film from 3M Company or other similar optical films. The flat light source 8 can also be formed with a simple polarization converter consisting of a reflective polarizer film 11 and a quarter wave plate 12 as an option. Because of its flatness, the polarization converter can be very simple as shown in FIG. 3. The reflective polarizer 11 transmits light of one polarization and reflects light of the perpendicular polarization. The reflected light goes through the quarter wave plate 12 twice upon reflection and is converted into the correct polarization for transmission. Thus most of the light from the flat light source can be extracted of one polarization only.

Figure 4:
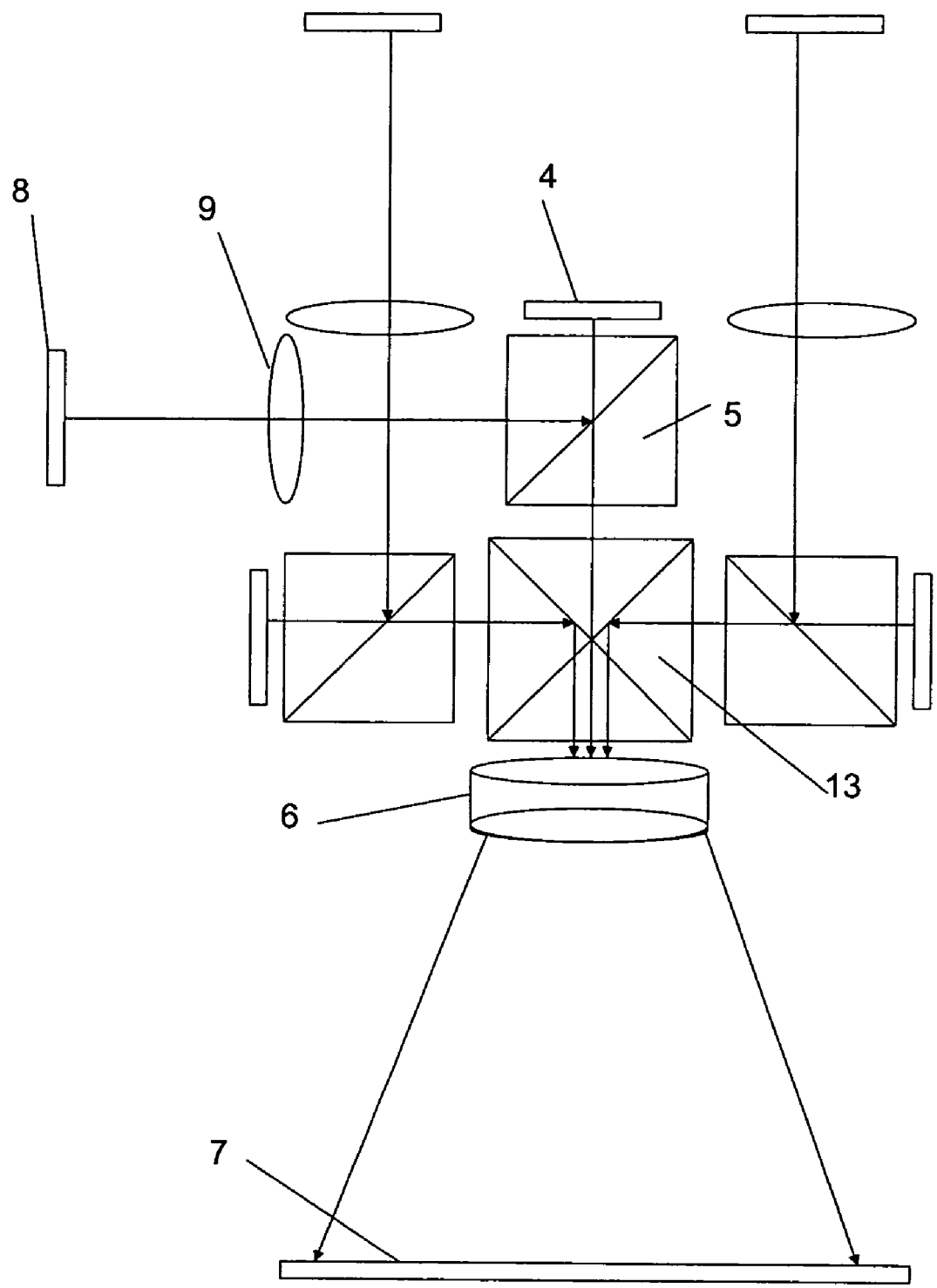
FIG. 4 shows a projection system according to a second embodiment of the present invention.

In the second preferred embodiment of the present invention shown in FIG. 4, three channels are provided for the projector, one for each primary color. The flat light source 8, the imaging lens 9, and the imager 4 are all similar. The three flat light sources emit red and green and blue lights separately to provide higher brightness to the projector. The imagers 4 are provided to work with all the colors of the flat light source. Alternatively, a single flat light source can be used in conjunction with dichroic filters to separate the light into three primary colors. In this second preferred embodiment, an X-cube 13 is used to combine the three light beams having images from the three primary colors of red green and blue.

Figure 5:
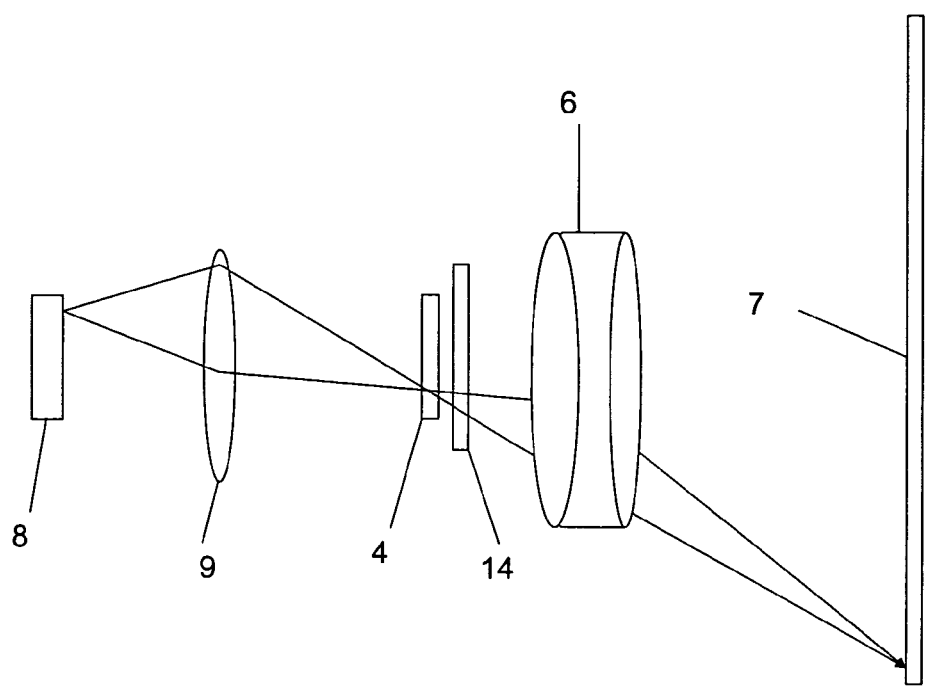
FIG. 5 shows a projection system according to a third embodiment of the present invention.

The third preferred embodiment of the present invention shown in FIG. 5 is substantially similar to the first embodiment (FIG. 2) except that a transmittive light valve 14 is used located between the imaging lens 9 and the projection lens 6.

Figure 6:
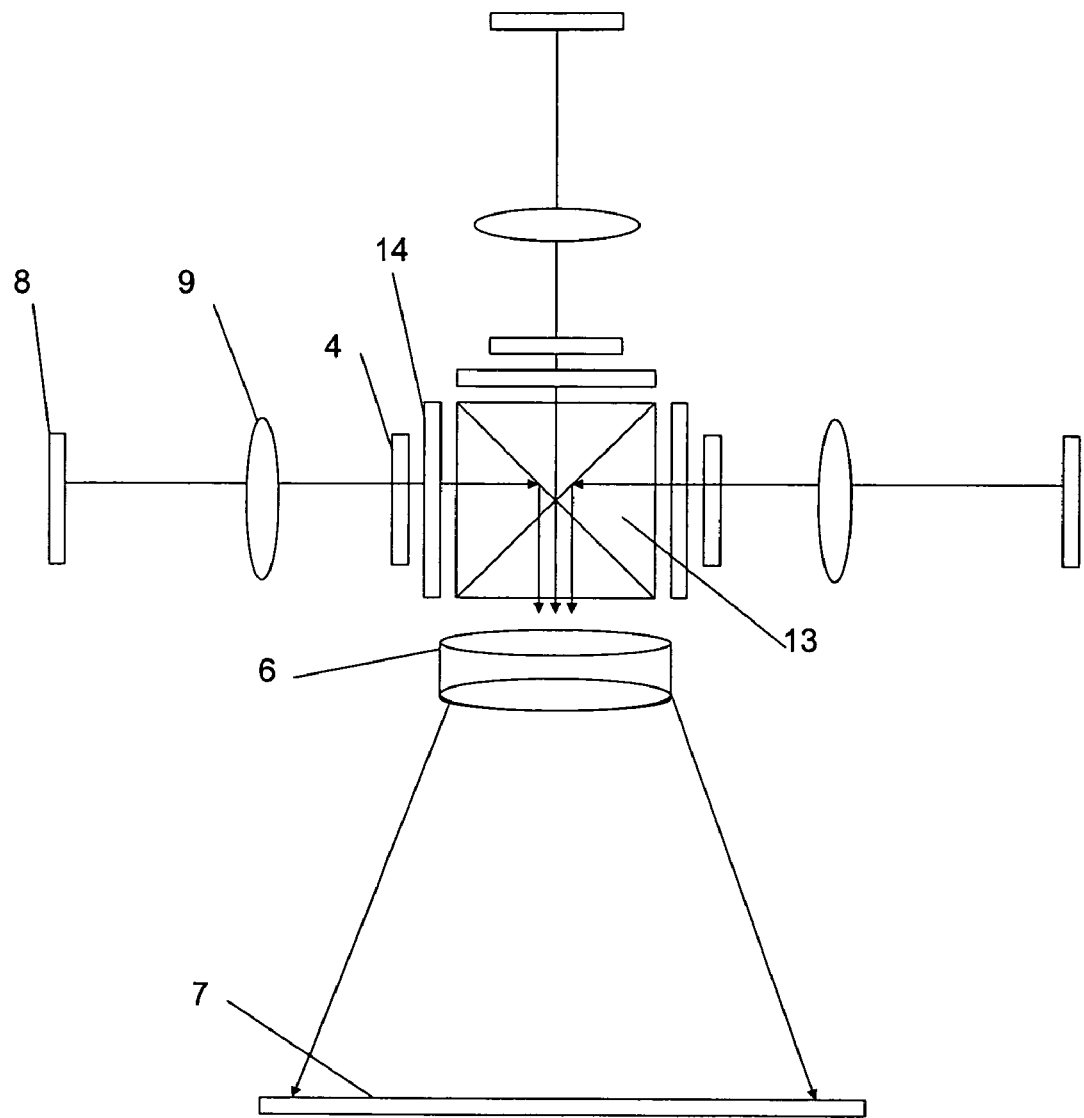
FIG. 6 shows a projection system according to a fourth embodiment of the present invention.

The fourth preferred embodiment of the present invention shown in FIG. 6 is substantially similar to the second embodiment (FIG. 4) except that three transmittive light valves 14 are used for the three primary colors of red green and blue. Each light valve 14 is located between the imaging lens 9 and the projection lens 6 of a respective red, green or blue channel.

Figure 7:
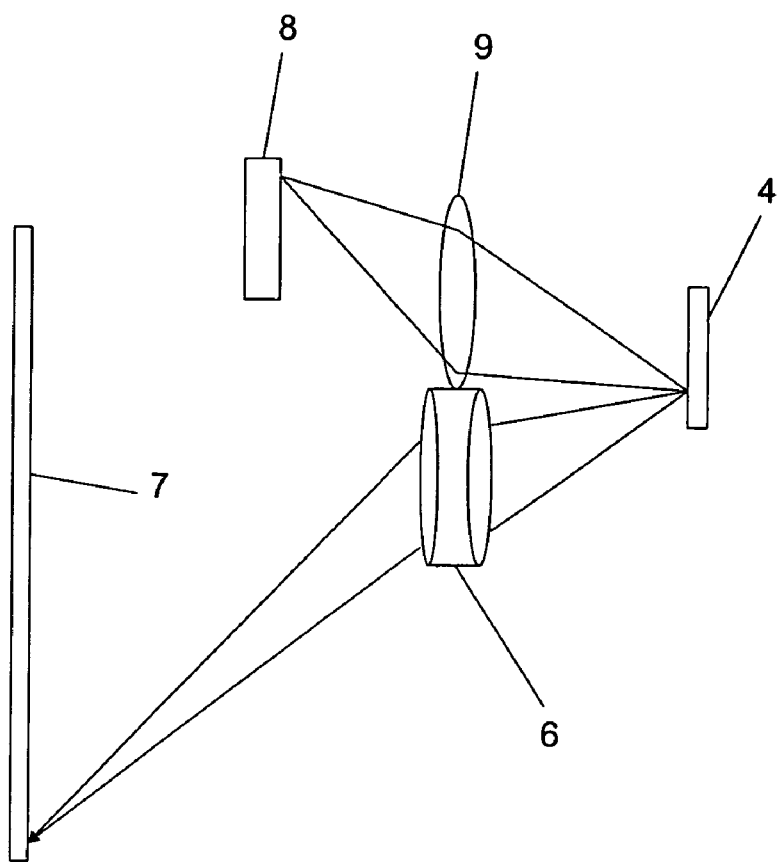
FIG. 7 shows a projection system according to a fifth embodiment of the present invention.

In the fifth preferred embodiment of the present invention shown in FIG. 7, the imager 4 is of the reflective and non-polarization manipulation type, such as the micromirror light valve manufactured by Texas Instruments Inc. In this case, the polarizers are not needed. Instead the reflection from the light valve is spatially separated from the input light of the flat light source as shown in FIG. 7. Here the light from the flat light source 8 is imaged onto the imager 4 by lens 9 as before. The direction of the reflected light is modulated by the imager. For the properly reflected light, the output is imaged onto the screen 7 by the projection lens 6. To provide full color in this display, the flat light source is pulsed in red green and blue for each subframe in a time sequential manner.

The invention claimed is:

1. A projection system comprising
   (a) a substantially planar light source,
   (b) a quarterwave retardation film and a reflective polarizer film placed in close proximity to said planar light source to convert light from said planar light source into a single polarization,
   (c) an imaging lens for imaging said planar light source onto a light valve imager,
   (d) a polarizing beam splitter for separating the input and output light on the said light valve imager, and
   (e) a projection lens to project the image on the light valve imager onto a screen.

2. A projection system as claimed in claim 1 wherein the light valve imager comprises a reflective liquid crystal on silicon microdisplay.

3. A projection system as claimed in claim 1 wherein the light valve imager is provided with color filters on subpixels.

4. A projection system as claimed in claim 1 wherein said planar light source is a vacuum field emission device.

5. A projection system as claimed in claim 1 wherein said planar light source is a cold cathode fluorescence lamp with a planar discharge plasma.

6. A projection system as claimed in claim 1 wherein said planar light source is an array of light emitting diodes arranged in a closely packed manner on a plane.

7. A projection system as claimed in claim 1 wherein said planar light source comprises an optical film for collimating the light so that it propagates predominantly in the forward direction.

8. A projection system as claimed in claim 1 wherein said planar light source comprises a reflective surface for reflecting ultraviolet light and transmitting visible light.

9. A projection system comprising
   (a) a substantially planar red light source,
   (b) means for converting light from said red planar light source into a single polarization,
   (c) a first imaging lens for imaging said red planar light source onto a first light valve imager,
   (d) a first polarizing beam splitter for separating the said red input and red output light on the said first light valve imager,
   (e) a substantially planar green light source,
   (f) means for converting light from said green planar light source into a single polarization,
   (g) a second imaging lens for imaging said green planar light source onto a second light valve imager,
   (h) a second polarizing beam splitter for separating the said green input and green output light on the said second light valve imager,
   (i) a substantially planar blue light source,
   (j) means for converting light from said blue planar light source into a single polarization,
   (k) a third imaging lens for imaging said blue planar light source onto a third light valve imager,
   (p) a third polarizing beam splitter that separates the said blue input and blue output light on the said third light valve imager,
   (m) an x-cube prism for combining the said output red, green and blue lights from the first, second and third light valve imagers, and
   (n) a projection lens for projecting the combined full color image of the combined first, second and third light valve imagers onto a screen.

10. A projection system as claimed in claim 9 wherein the light valve imagers comprises reflective liquid crystal on silicon microdisplays.

11. A projection system as claimed in claim 9 wherein said red, green and blue planar light sources are separate sources.

12. A projection system as claimed in claim 9 wherein a single planar white light source is provided, said system further comprising red, green and blue dichroic filters to provide said red, green and blue light sources.

13. A projection system as claimed in claim 9 wherein the means for converting the light output from the red, green and blue planar light sources into a single polarization comprises first, second and third quarterwave retardation films and reflective polarizer films placed respectively in close proximity to the respective red, green and blue planar light sources.

14. A projection system as claimed in claim 9 wherein each said planar light source comprises a vacuum field emission device.

15. A projection system as claimed in claim 9 wherein each said planar light source comprises a cold cathode fluorescence lamp with a planar discharge plasma.

16. A projection system as claimed in claim 9 wherein each said planar light source comprises an array of light emitting diodes arranged in a closely packed manner on a plane.

17. A projection system as claimed in claim 9 wherein each said planar light source comprises an optical film for collimating the light so that is propagates predominantly in the forward direction.

18. A projection system as claimed in claim 9 wherein each said planar light source is provided with a reflective surface to reflect ultraviolet light and transmit visible light.

19. A projection system comprising
    (a) a substantially planar light source,
    (b) a quarterwave retardation film and a reflective polarizer film placed in close proximity to said planar light source to convert light from said planar light source into a single polarization,
    (c) an imaging lens for imaging said planar light source onto a transmittive active matrix liquid crystal cell light valve imager, and
    (d) a projection lens for projecting the image on the light valve imager onto a screen.

20. A projection system as claimed in claim 19 wherein said planar light source comprises a vacuum field emission device.

21. A projection system as claimed in claim 19 wherein said planar light source comprises a cold cathode fluorescence lamp with a planar discharge plasma.

22. A projection system as claimed in claim 19 wherein said planar light source comprises an array of light emitting diodes arranged in a closely packed manner on a plane.

23. A projection system as claimed in claim 19 wherein said planar light source comprises an optical film for collimating the light so that it propagates predominantly in the forward direction.

24. A projection system as claimed in claim 19 wherein said planar light source is provided with a reflective surface to reflect ultraviolet light and transmit visible light.

25. A projection system comprising
    (a) a substantially planar red light source,
    (b) means for converting light from said red planar light source into a single polarization,
    (c) a first imaging lens for imaging said red planar light source onto a first transmittive active matrix liquid crystal cell light valve imager,
    (d) a substantially planar green light source,
    (e) means for converting light from said green planar light source into a single polarization, (f) a second imaging lens for imaging said green planar light source onto a second transmittive active matrix liquid crystal cell light valve imager,
(g) a substantially planar blue light source,
(h) means for converting light from said blue planar light source into a single polarization,
(i) a third imaging lens for imaging said blue planar light source onto a third transmittive active matrix liquid crystal cell light valve imager,
(j) an x-cube prism for combining the said output red green and blue lights from the three light valve imagers, and
(k) a projection lens for projecting the combined full color image of the combined first, second and third light valve imagers onto a screen.

26. A projection system as claimed in claim 25 wherein the means for converting the light output from the red, green and blue planar light sources into a single polarization comprises first, second and third quarterwave retardation films and reflective polarizer films placed respectively in close proximity to the respective red, blue and green planar light sources.

27. A projection system as claimed in claim 25 wherein each said planar light source is a vacuum field emission device.

28. A projection system as claimed in claim 25 wherein each said planar light source is a cold cathode fluorescence lamp with a planar discharge plasma.

29. A projection system as claimed in claim 25 wherein each said planar light source is an array of light emitting diodes arranged in a closely packed manner on a plane.

30. A projection system as claimed in clam 25 wherein each said planar light source comprises an optical film for collimating the light so that it propagates predominantly in the forward direction.

31. A projection system as claimed in claim 25 wherein each said planar light source comprises a reflective surface for reflecting ultraviolet light and transmitting visible light.

32. A projection system comprising
(a) a substantially planar light source having an optical film for collimating the light so that it propagates predominantly in the forward direction,
(b) means for pulsing the said light source to provide red, green and blue colors sequentially in time,
(c) an imaging lens for imaging said planar light source onto a reflective digital mirror light valve imager, and
(d) a projection lens for projecting the image on the said light valve imager onto a screen.

33. A projection system as claimed in claim 32 wherein said planar light source is a vacuum field emission device.

34. A projection system as claimed in claim 32 wherein said planar light source is a cold cathode fluorescence lamp with a planar discharge plasma.

35. A projection system as claimed in claim 32 wherein said planar light source is an array of light emitting diodes arranged in a closely packed manner on a plane.

36. A projection system as claimed in claim 32 wherein said planar light source comprises a reflective surface for reflecting ultraviolet light and transmitting visible light.

37. A projection system comprising
(a) a substantially planar red light source,
(b) a first imaging lens for imaging said red planar light source onto a first reflective digital mirror light valve imager,
(c) a substantially planar green light source,
(d) a second imaging lens for imaging said green planar light source onto a second reflective digital mirror light valve imager,
(e) a substantially planar blue light source,
(f) a third imaging lens for imaging said blue planar light source onto a third reflective digital mirror light valve imager,
(g) an x-cube prism for combining the said output red green and blue lights from the three light valve imagers, and
(h) a projection lens for projecting a combined full color image of the said light valve imagers onto a screen.

38. A projection system as claimed in claim 37 wherein each said planar light source comprises a vacuum field emission device.

39. A projection system as claimed in clam 37 wherein each said planar light source comprises a cold cathode fluorescence lamp with a planar discharge plasma.

40. A projection system as claimed in clam 37 wherein each said planar light source comprises an array of light emitting diodes arranged in a closely packed manner on a plane.

41. A projection system as claimed in claim 37 wherein each said planar light source comprises an optical film to collimate the light to propagate predominately in the forward direction.

42. A projection system as claimed in claim 37 wherein each said planar light source comprises a reflective surface to reflect ultraviolet light and transmit visible light.

* * * * *